(No Model.)
J. L. YOST.
BICYCLE.
No. 334,325. Patented Jan. 12, 1886.
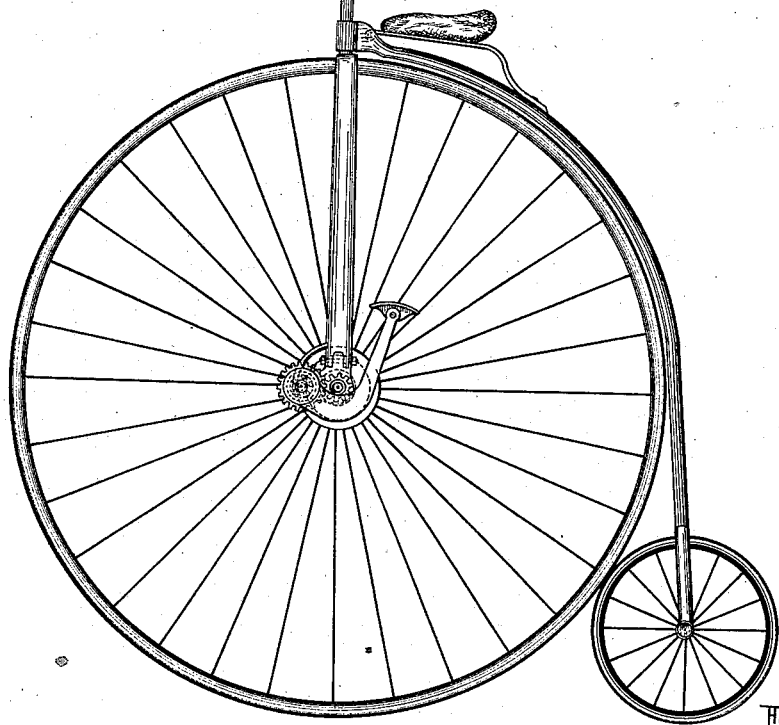
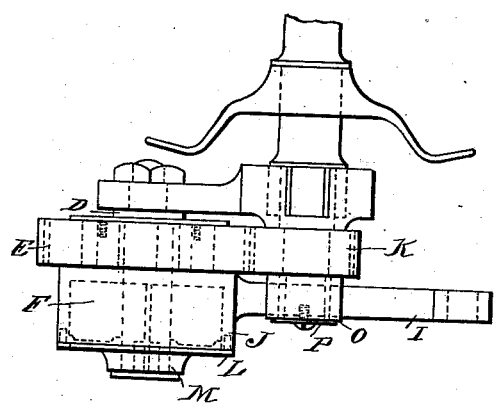
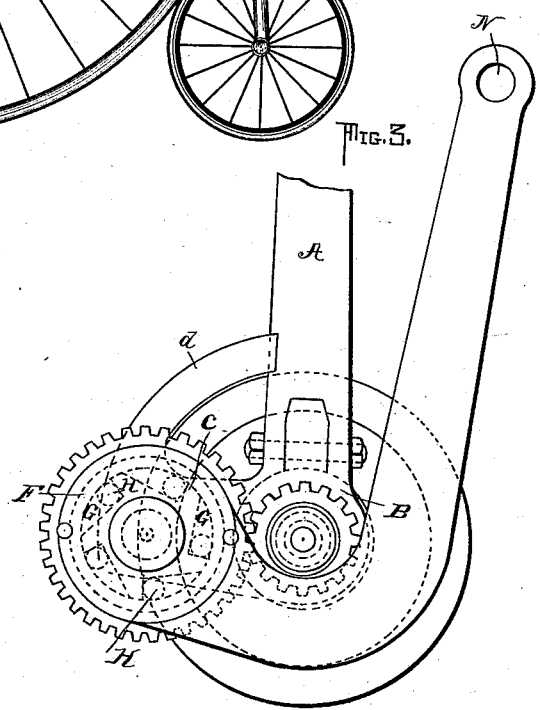
Witnesses
Wm Rheem.
David Ahmed.
Inventor
Joseph L. Yost.
By his Attorney Wm C McIntire

UNITED STATES PATENT OFFICE.

JOSEPH L. YOST, OF CHICOPEE, MASSACHUSETTS.

BICYCLE.

SPECIFICATION forming part of Letters Patent No. 334,325, dated January 12, 1886.

Application filed September 17, 1885. Serial No. 177,327. (No model.)

*To all whom it may concern:*

Be it known that I, JOSEPH L. YOST, a citizen of the United States, residing at Chicopee, Massachusetts, have invented new and useful Improvements in Bicycles, of which the following is a specification.

This invention relates to means for propelling vehicles of the kind in which the motive power is supplied by the rider, and particularly to means for propelling what are known as "vertical-fork" bicycles. Heretofore these have usually been driven by cranks connected directly with the axle of the larger wheels or by some other means which require a downward and forward motion of the legs of the operator. This manner of driving, coupled with the strain which is exerted upon the handle of the machine to prevent the rider or operator from falling backward, renders him extremely liable to be thrown forward when an obstruction is met.

The objects of the present invention are, first, to produce a driving mechanism to which the power may be applied by a direct downward thrust of the limbs, and by this means the weight of the body is utilized in propelling the machine.

Second. The object is to provide a driving mechanism in which the power exerted may be multiplied to any suitable degree.

Third. The invention consists in improved means for securing the gear-wheels through which the axle receives motion upon the said axle in such manner that the power exerted will have a tendency to tighten the said gear-wheels upon the axle; and, finally, the invention consists in certain novel details of construction, whereby the objects of the invention are accomplished, the operation of the device rendered certain, and the stability of the driving mechanism secured.

In order that those skilled in the art to which my invention appertains may know how to make and use the same, I will now proceed to describe it in connection with the accompanying drawings, in which—

Figure 1 represents a side view of a vertical-fork bicycle with my invention applied. Fig. 2 is a horizontal section of the driving mechanism; and Fig. 3 represents a side elevation of the operating mechanism, partly in section, in order to disclose the interior disposition of parts.

In the drawings, A represents the lower portion of one side of the fork of the bicycle, and B represents a casting, of any suitable metal, which is provided with a circular opening for the passage of the axle of the large wheel, and is also provided with an upward projection upon which the fork of the bicycle rests, and to which it is secured by a suitable bolt or pin. This casting is provided also with a forward extension, c, in which the operating-lever has its bearing, and by which the mechanism which communicates motion from the operating-lever to the wheel is carried, as will be fully set forth hereinafter. As a convenient means of strengthening this casting and to prevent its being depressed by the force exerted upon it by the lever in propelling the vehicle, I provide the said casting with an upwardly-extending curved projection, d, which is rigidly secured by any desired means to the fork of the bicycle, and by this means the bearing upon which the lever is mounted is secured permanently in place.

D represents a pin, which is attached by suitable nut to the forward extension of the casting B, and upon this pin is keyed a gear-wheel, E, and a disk, F, provided with a series of tangential notches, G, which decrease in width from the center outward, and in these notches are retained a series of rollers or bowls, H.

The operating-levers I and the cylinder J are formed together, and this cylinder incloses the disk F, and the rolls contained in the notches in said disk bear against the inside of the said cylinder, and thus it will be apparent that the lever may be moved in one direction without moving the axle, while if turned in the opposite direction the roll will be carried by frictional contact to the narrower part of the notches in the disk, and in this way the gear-wheel E, to which is joined the notched disk F, by means of a square opening in one entered by a similarly-shaped projection from the other, is moved. The movement of the gear-wheel E is communicated to the wheel through the medium of the gear-wheel K, fixed upon the axle of the wheel. The relative sizes of the gears E and K may be changed at will, and in this way the speed of the gear K may be multiplied to any suitable degree consistent with a reasonable amount of driving-power relative to the gear E. The cylinder, formed with the operating-levers I, is retained in proper position by means of a circular plate or cap, L, which is fastened upon the end of the pin D by means of a nut, M.

With a view to fastening the gear-wheels upon the axle in a cheap and simple way, and so that they are rendered incapable of moving out of the position which they are designed to occupy, I provide the said axle with threads upon its end, the right-hand end being provided with a right-hand screw and the left-hand end being provided with a left-hand screw, and thus it will be seen that the force exerted to propel the bicycle will tend to tighten the gears upon the axle. The operating-levers I extend upward and rearward from their points of support, and they are provided at their upper ends with pedals N, of suitable form, and these pedals are situated directly beneath the saddle, so that the thrust of the leg, by which the bicycle is propelled, is made in a downward direction, and the weight of the body of the rider may thus be utilized to advantage. The operating-lever is returned to its normal position after being depressed and relieved from pressure by the foot by means of a coil-spring, e, contained in the cylindrical portion J. One end of this spring is connected to the pin D, and the other end is connected to the inside of the cylinder in any suitable manner. A downward movement of the operating-lever contracts this spring, and the resiliency thereof returns the lever to its normal position when pressure is removed from the lever. The operating-lever in its normal position rests against the outer end of the axle, and in order that the blow of the said lever upon the axle as the lever returns to its normal position may be deadened, I provide the said axle with a rubber sleeve, O, which is mounted upon a freely-revolving metal sleeve retained in place by a disk, P, against which the lever strikes when returning to its normal position.

Having thus described my invention, what I claim as new, and desire to secure by Letters Patent, is—

1. The herein-described operating devices, consisting of the combination, with the fork and axle of a bicycle, of the casting provided with a forward projection, the operating-gears provided with clutch mechanism and mounted in the forward end of said projecting casting, the operating-lever extending rearward to a point within a vertical plane dropped from the saddle, and a gear mounted upon the axle of the bicycle and meshing with the gear at the forward end of the projecting casting, the relation of the parts being such, as described, that the foot end of the operating-lever shall move up and down in a vertical plane dropped from the seat or saddle.

2. The combination, with the fork and axle of a bicycle, of the casting provided with a forward extension having mounted thereon the gear D, having connected therewith the clutch consisting of the shell, the disk provided with the inclined notches, the rollers placed in said notches and bearing against the shell, the coil-spring connected at one end to the pin upon which the clutch is mounted and to the shell at the other, and the operating-lever connected to the clutch and extending rearward to a point beneath the saddle, substantially as described.

3. The combination, with the bicycle, of the casting carrying the gear and clutch and operating-lever and the axle provided with a gear, and the rubber sleeve against which the operating-lever bears.

4. The combination, with a bicycle, of the casting carrying the gear-clutch and operating-lever and the axle provided with the gear and freely-revolving metal sleeve carrying the rubber sleeve, substantially as described.

In testimony whereof I have hereunto set my hand and seal in the presence of two subscribing witnesses.

JOS. L. YOST. [L. S.]

Witnesses:
JULIUS M. LANE,
JOSEPH D. PLIMPTON.